United States Patent [19]

Burns

[11] 4,425,768

[45] Jan. 17, 1984

[54] ICING APPARATUS FOR PALLET SUPPORTED CARTONS

[75] Inventor: Daniel E. Burns, Camarillo, Calif.

[73] Assignee: Demco, Inc., Oxnard, Calif.

[21] Appl. No.: 432,079

[22] Filed: Sep. 30, 1982

[51] Int. Cl.$^3$ ............................................. F25D 15/00
[52] U.S. Cl. ........................................ 62/237; 62/373
[58] Field of Search ................... 62/237, 373, 376, 64

[56] References Cited

U.S. PATENT DOCUMENTS

| | | | |
|---|---|---|---|
| 3,477,243 | 11/1969 | Schroeder et al. | 62/237 |
| 4,249,388 | 2/1981 | Burns | 62/60 |
| 4,380,908 | 4/1983 | Crabb, Jr. | 62/237 |

*Primary Examiner*—Ronald C. Capossela
*Attorney, Agent, or Firm*—Ralph B. Pastoriza

[57] ABSTRACT

The icing apparatus comprises an open frame structure for receiving cartons stacked in rows and columns on a pallet. These cartons contain perishable food such as broccoli brought in from the field and are to be treated with liquid ice to preserve their contents. Towards this end, the apparatus includes left and right carriages carrying horizontal rows of liquid ice injecting probes or nozzles. These carriages can move up and down left and right sides of the frame and also the probes themselves can be moved in and out towards and away from cartons on the pallet. By this arrangement, an upper horizontal row of cartons can be simultaneously iced by the horizontal row of probes by simply moving the same into the hand hold openings of the cartons. The carriage structures can then be lowered by the heighth dimension of the cartons and a next horizontal row of cartons simultaneously treated with liquid ice. The process is repeated until all cartons on the pallet have been treated with liquid ice, the cartons then being removed while still on the pallet.

6 Claims, 3 Drawing Figures

ICING APPARATUS FOR PALLET SUPPORTED CARTONS

FIELD OF THE INVENTION

This invention relates generally to icing equipment and more particularly to an icing apparatus for automatically icing rows and columns of cartons containing perishable foods stacked on a pallet without having to remove the cartons from the pallet.

BACKGROUND OF THE INVENTION

Harvested fresh vegetables are normally packed in cartons provided with convenient hand hold opening on opposite ends. For example, fresh broccoli might constitute a typical perishable food handled in this manner. In order to preserve the freshness of the vegetables during shipment to various locations, the cartons themselves are normally treated with liquid ice and towards this end, there have been provided a number of systems for icing the cartons.

An example of an automatic liquid ice system such as discussed above is shown in my U.S. Pat. No. 4,249,388 issued Feb. 10, 1981. In the system disclosed in this patent, cartons are passed along a conveyor belt and icing probes located in an overhead structure inject liquid ice into the contents of the box. As the box or carton moves down the conveyor belt, it is appropriately covered and ready for shipment.

The cartons of perishable food are normally dimensioned to be easily stacked in rows and columns on a pallet. As a result, a conventional forklift can be used for transferring the cartons from one location to another by simply lifting the pallet. However, when liquid ice is to be applied to the various cartons, it has always heretofore been necessary to unload the cartons from the pallet and place them on a conveyor such as described in my above U.S. patent or individually ice each of the cartons. The ice must then be replaced on a pallet or on another pallet for transference to a railroad car or truck for shipment.

BRIEF DESCRIPTION OF THE PRESENT INVENTION

With the foregoing in mind, the present invention contemplates a vastly improved liquid icing system for cartons wherein several such cartons can be iced simultaneously while actually stacked on a pallet so that the time and labor involved in removing and restacking the cartons on a pallet in order to ice the same are eliminated.

More particularly, and in its broadest aspect, the apparatus includes a frame structure for receiving a pallet with cartons stacked thereon. At least one carriage is mounted to one side of the frame for up and down movement and at least two liquid ice-injecting probes in horizontally spaced relationship corresponding to the spacing between the hand hold openings in the adjacent cartons in a row on the pallet are mounted to the carriage for in and out movement towards and away from the cartons on the pallet. By this arrangement, cartons in a row on the pallet can be simultaneously iced by injecting ice from the probes after moving the probes inwardly to pass through the hand-held openings in adjacent cartons, thereafter the probes being withdrawn and the carriage moved in a vertical direction to position the probes for reception in the hand held openings of the next cartons in vertically spaced position from the first mentioned cartons in the columns of cartons so that when inward movement is again effective, the next cartons can be simultaneously iced.

The above described operation can be carried out without having to remove any of the cartons from the pallet, the pallet itself being positioned with the cartons in the frame and removed from the frame by a simple forklift.

BRIEF DESCRIPTION OF THE DRAWINGS

A better understanding of this invention will be had by now referring to a preferred embodiment thereof as illustrated in the accompanying drawings in which.

DETAILED DESCRIPTION OF THE PREFERRED EMBODIMENT

Figure 1:
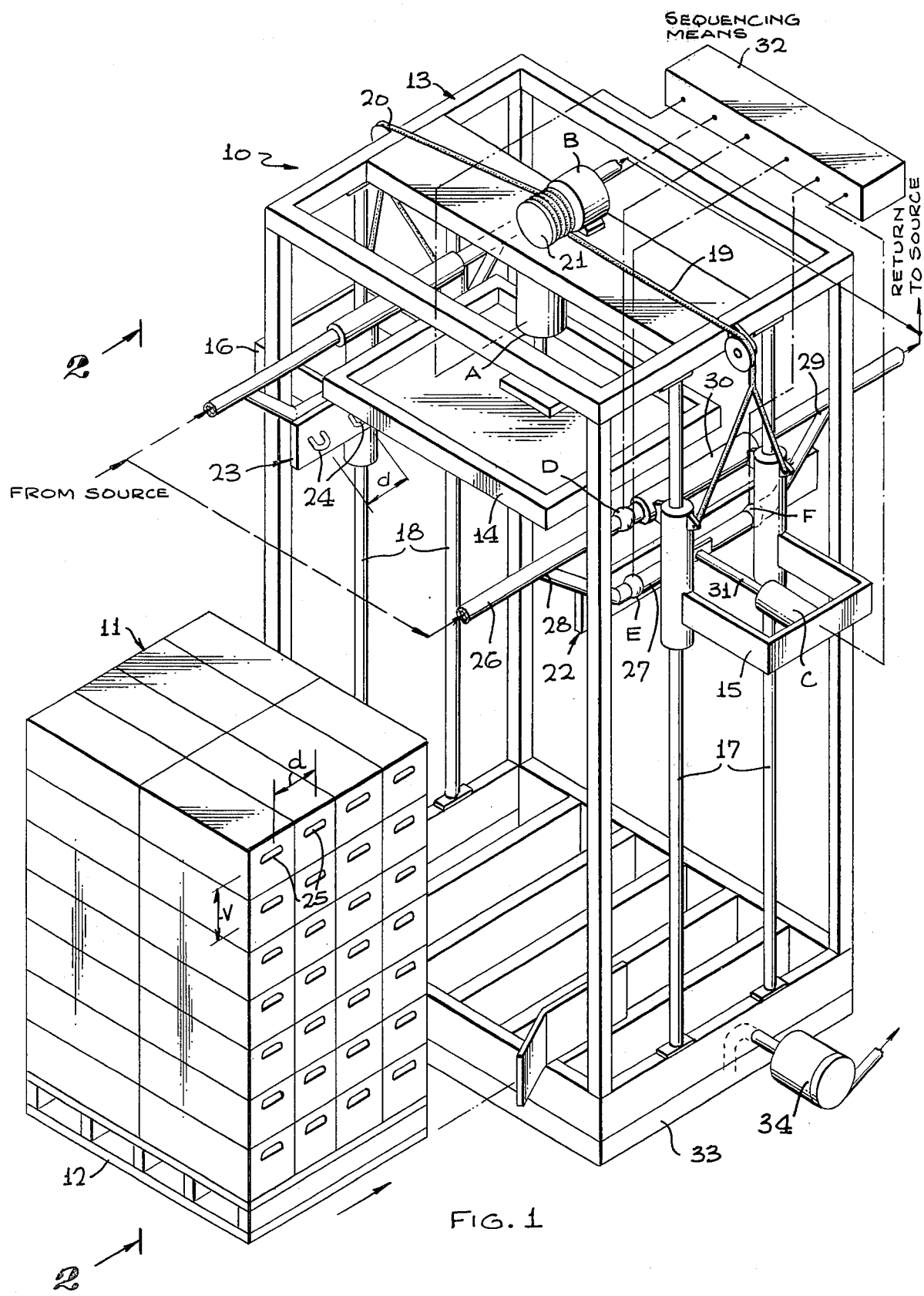
FIG. 1 is a perspective view partly schematic in form illustrating the icing apparatus of this invention.

Referring first to FIG. 1 there is indicated generally by the arrow 10 in the upper left corner the icing apparatus preparatory to receiving a plurality of cartons indicated generally by the numeral 11 of perishable food stacked in rows and columns on a pallet 12 shown in the lower left portion of FIG. 1. The apparatus 10, itself, includes the frame structure 13 incorporating a top platform 14 in the upper portion of the frame as shown. Platform power means in the form of a hydraulic cylinder A is provided to raise and lower the platform such that after the cartons 11 have been moved into the frame, the platform 14 can be lowered into engagement with the top rows of cartons on the pallet to stabilize the columns and rows.

Left and right carriages indicated at 15 and 16 are mounted for up and down movement to the left and right sides of the frame structure as by vertical rails 17 and 18 respectively. Carriage power means B is supported on the top of the frame 13 as shown and may include cables 19 and 20 wound on a drum 21 and connecting to the carriages 15 and 16 for effecting up and down movement of these carriages.

Each of the carriages 15 and 16 in FIG. 1 carry left and right probe assemblies 22 and 23, each of the probe assemblies including a horizontal row of liquid ice injecting probes such as indicated at 24 for the probe assembly 23. The spacing between these probes is indicated at d in FIG. 1 for the probe assembly 23 and corresponds to the spacing between the hand hold openings 25 for the cartons 11. This spacing is also indicated by the letter d in FIG. 1. It will be understood that the probe assembly 22 for the left hand carriage 15 in FIG. 1 includes a row of probes corresponding to the probes 24 on the right hand probe assembly 23, the probes on the probe assembly 22 not being visible in the view of FIG. 1. Actually, the left and right carriages 15 and 16 and left and right probe assemblies 22 and 23 of FIG. 1 are mirror images of each other and thus a detailed description of one will suffice for both.

Probe assembly power means may take the form of a hydraulic cylinder C for moving the probe assemblies such as the assembly 22 shown in FIG. 1 towards and away from cartons received within the frame 13. In the particular embodiment illustrated, this movement involves appropriate conduit means for passing liquid ice from a source to the probe assemblies.

Still referring to the left carriage means 15 and probe assembly 22, the above referred to conduit means takes the form of a main conduit 26 for receiving liquid ice from a source as indicated by the dashed lines and returning liquid ice to the source. Cooperating with main conduit 26 is a branch conduit 27 connecting to the main conduit at spaced points 28 and 29 so as to be in parallel therewith. It is to be understood that the liquid ice injecting probes in the probe assembly 22 extend from the sides of the branch conduit 27 so that any liquid ice in this conduit will be passed through all of the probes simultaneously. To provide for the control of liquid ice to the probes from the branch conduit, there are included valve means in the form of a main valve D in the main line 26 between the spaced points 28 and 29 and first and second valves E and F in the branch line between the spaced points 28 and 29 and the start and end of the horizontal row of extending probes from the probe assembly 22. With this arrangement, ice can be delivered to the probes by closing the main valve D and opening at least the first valve E. When liquid ice is not to be injected, preferably both valves E and F are closed and valve D is opened to simply recirculate the liquid ice.

Still referring to the carriage 15 and probe assembly 22 of FIG. 1, it will be noted that the mounting for the probe assembly heretofore referred to as enabling in and out movement of this probe assembly is accomplished by the provision of a journaling sleeve 30 surrounding the main conduit 26 between the points 28 and 29, this journalling sleeve 30 being secured to the carriage 15 so that it will move up and down with the carriage carrying therewith the main conduit 26 and branch conduit 27. A piston rod 31 is shown extending from the probe assembly power means in the form of the hydraulic cylinder C so that when this piston rod is extended, the probe assembly 22 will essentially swing or pivot about the axis of the main conduit 26 as a consequence of the supporting journaling sleeve 30.

The right hand probe assembly 23 in FIG. 1 is similarly mounted for swinging or pivoting movement about the corresponding main conduit.

The apparatus of FIG. 1 is completed by the provision of a sequencing means indicated schematically by the block 32 in the upper right hand portion of the drawing. Essentially, the sequencing means operates the platform power means A, the carriage power means B, the probe assembly power means C, and the various valves D, E, and F, all as indicated by the dashed lines connecting the sequencing means 32 to these components. The sequential operation is such that first rows of cartons on the pallet will be simultaneously iced and then the next vertically spaced rows in the columns will be automatically simultaneously iced, and so forth until all cartons on the pallet have been iced.

Figure 2:
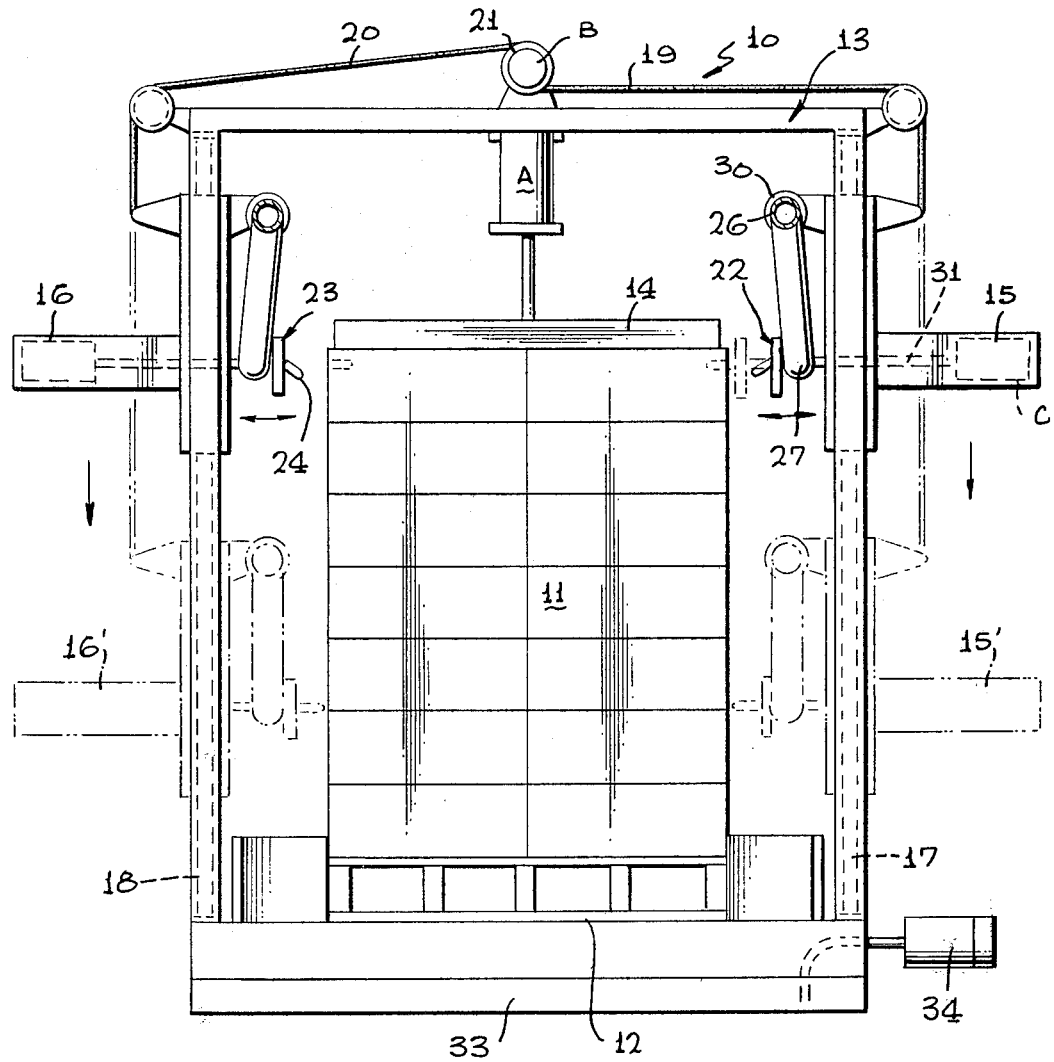
FIG. 2 is a front elevational view of the apparatus looking in the direction of the arrows 2—2 of FIG. 1 after a pallet holding cartons has been received in the apparatus; and, FIG. 3 is a sequencing diagram useful in explaining the operation of the apparatus.

All of the foregoing can better be understood by now referring to the front elevational view of FIG. 2. As shown, the probe assemblies 22 and 23 are shown is solid lines in their out positions or retracted positions. When they are moved inwardly by action of the power means C, they assume the dotted line or phantom line position illustrated in FIG. 2, the same swinging or pivoting by means of the journalling sleeve 30 about the main conduit 26.

Also illustrated by means of phantom lines in FIG. 2 are the movements of left and right carriages 15 and 16 in up and down directions. For example, the carriages 15 and 16 are shown in phantom lines at 15' and 16' in a substantially lower position preparatory to injecting liquid ice in the next to bottom rows of cartons 11 on the pallet 12.

Referring once again to the solid line showing of the probe assemblies 22 and 23, it will be noted that the probes themselves such as the probe 24 may extend at a slightly downwardly inclined angle when the probes are retracted so that when they swing about the axis of the main conduit 26 or axis of the sleeve 30, they will penetrate into the hand hold openings of the cartons in a substantially normal or straight-in direction.

When injecting liquid ice into the various cartons, there can be some overflow or spillage and any cold water or liquid ice itself is collected on the bottom of the structure as by a collecting tank 33. An appropriate cold water return pump shown at 34 in both FIGS. 1 and 2 can be optionally provided for returning this excess spilled liquid to the source.

Figure 3:
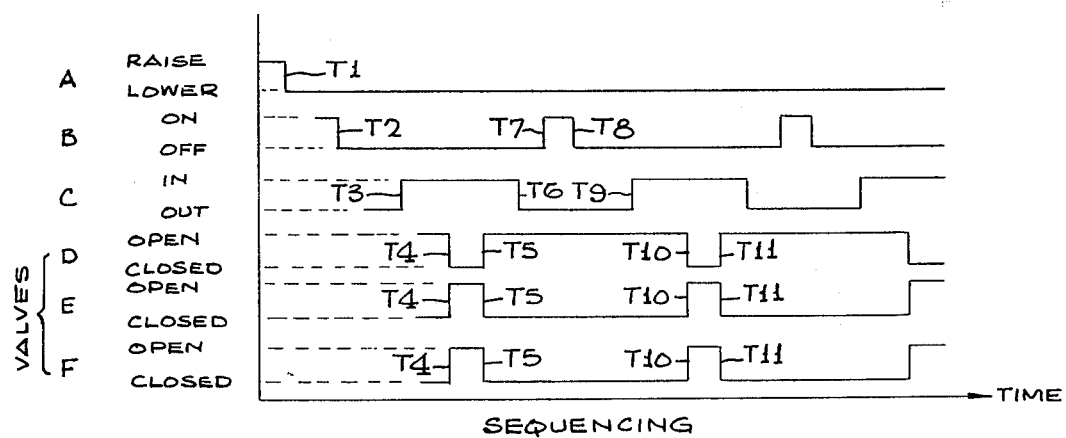

Referring now to FIG. 3, there is shown a simple sequencing diagram which will make the operation of the structure of FIGS. 1 and 2 clear.

Referring to the top diagram, the same represents the raising and lowering action of the power cylindar A for the platform 14. Similarly, the next diagram illustrates the on/off status of the power source B which might constitute an electrical motor for driving the drum 21 in an appropriate direction to raise or lower the carriages 15 and 16. The third diagram illustrates the in and out status of the probe assemblies 22 and 23 as controlled by the hydraulic cylinder B while the fourth, fifth and sixth diagrams illustrate the condition of the valves D, E, and F, respectively.

Still referring to FIG. 3, when a pallet containing cartons is first received within the apparatus, there may be a stack which can vary from four to seven cartons high. In order that the cartons can be appropriately stabilized, once they are received within the apparatus, the first operation is to lower the platform 14 as by operation of the power source A to engage the topmost row of cartons and thus stabilize the positions of the cartons on the pallet. This operation is illustrated at time T1, the platform 14 engaging the top row of cartons at this point in time.

Next, such as at time T2 the motor B is energized to position the carriages 15 and 16 in a manner such that the probe assemblies 22 and 23 are just opposed to the hand hold openings of the top rows of cartons 11. The power source B is then turned off so that the carriages will remain in this initially set position.

Next, the power source in the form of the cylinder C is actuated to cause the probe assemblies 22 and 23 to move inwardly as at time T3. The probe will thus penetrate into the rows of cartons.

Next, the valve D is closed at time T4 and simultaneously, the valves E and F are both opened as at time T4 as indicated. Ice slurry passing through the main conduit is thus forced into the branch conduit 27 described in FIG. 1 and out the various probes 24 connecting to the branch conduit. Any excess ice continues along the branch conduit back to the main conduit and is returned to the source. The pressure of ice extruded from the probes or nozzles can be controlled by the degree of opening of the second valve F. In some instances, this valve could be completely closed so that all liquid ice will be delivered to the probes and thus into the cartons.

Still referring to FIG. 3, at time T5, the main valve D is opened and the first and second valves E and F are simultaneously closed, the length of time that the valves are functional being only a few seconds; that is, sufficient to assure that an adequate amount of liquid ice is injected into the cartons.

At time T6, the power source C is operated to retract or move out the probe assemblies and at time T7 the power source B is operated to now lower the carriages to the next row of cartons to be treated. When the carriages reach the next row at time T8, then the motor B is turned off and the carriages held in this position. Thereafter, the power source C is again operated to move the probe assemblies into engagement with the sides of the cartons so that the probes penetrate through the hand hold openings. This operation is indicated at T9 and thereafter the valves are again operated at T10 and returned to their original positions at T11. In other words, the cycle simply repeats for the subsequent rows until all rows of cartons have been treated.

After the lowermost row has been treated as described above, the platform 14 is raised upwardly to release the cartons and the pallet 12 is removed with a forklift together with the cartons still on the pallet. The carriages 15 and 16 are returned to their uppermost positions and the structure is ready to receive a next pallet load of stacked cartons.

As mentioned heretofore, any excess liquid ice in collected in the tank 33 and removed by the return pump 34 to the source.

From all of the foregoing, it will thus be evident that the present invention has provided a greatly improved icing apparatus which enables the icing of cartons without having to remove them from a stacked position on a pallet.

Various changes falling with the scope and spirit of this invention will occur to those skilled in the art. The icing apparatus accordingly is not to be thought of as limited to the exact embodiment shown merely for illustrative purposes.

I claim:

1. An apparatus for icing a plurality of cartons of perishable food stacked in rows and columns on a pallet, including, in combination:
   (a) a frame structure for receiving said pallet with cartons stacked thereon;
   (b) at least one carriage mounted to one side of said frame for up and down movement; and,
   (c) at least two liquid ice injecting probes in horizontally spaced relationship corresponding to the spacing between the hand hold openings in adjacent cartons in a row on said pallet, said probes being mounted to said carriage for in and out movement towards and away from said cartons on said pallet whereby cartons in a row on said pallet can be simultaneously iced by injecting ice from said probes after moving the probes inwardly to pass through said hand hold openings in adjacent cartons, and whereby thereafter, the probes can be withdrawn and said carriage moved in a vertical direction to position the probes for reception in the hand held openings of the next cartons vertically spaced from the first mentioned cartons in said columns of cartons so that when inward movement is again effected, the next cartons can be iced.

2. An apparatus according to claim 1, including a top platform mounted in the upper portion of said frame; and means for moving said platform so that after a pallet with cartons stacked thereon has been received in said frame, the platform can be lowered onto the topmost cartons to hold and stabilize the cartons rows and columns when ice is being injected into the cartons, and thereafter raised to free the cartons.

3. An apparatus according to claim 1, including first power means responsive to first control signals for moving said carriage up and down and second power means responsive to second control signals for moving said probes in and out; and means for sequencing said first and second control signals so that automatic icing of the cartons can be carried out by said first and second power means.

4. An apparatus for automatically icing a plurality of cartons of perishable food stacked in rows and columns on a pallet, including, in combination
   (a) a frame structure for receiving said pallet with the cartons stacked thereon;
   (b) a platform in the upper portion of said frame;
   (c) platform power means for lowering and raising the platform into and out of engagement with the top rows of cartons on the pallet to stabilize the rows and columns of cartons;
   (d) left and right carriages mounted for up and down movement to the left and right sides of said frame structure respectively;
   (e) carriage power means for moving said carriages in up and down directions;
   (f) left and right probe assemblies, each assembly carrying a horizontal row of liquid ice injecting probes spaced at distances corresponding to the spacing between the hand hold openings in adjacent cartons in a row on said pallet said left and right probe assemblies being mounted to said left and right carriages respectively for in and out movement towards and away from the cartons on said pallet;
   (g) probe assembly power means carried on said carriages for moving said probe assemblies towards and away from said cartons;
   (h) conduit means for passing liquid ice from a source to said probe assemblies;
   (i) valve means in said conduit means for controlling the application of liquid ice to the probes in said assemblies; and
   (j) sequencing means for sequentially operating said platform power means, said carriage power means, said probe assembly power means and said valve means in an appropriate manner so that first rows of cartons are iced simultaneously and then the next vertically spaced rows in the columns are iced simultaneously, and so forth, until all cartons on the pallet have been iced.

5. An apparatus according to claim 4, in which said conduit means for each probe assembly includes a main conduit for carrying liquid ice from and to said source; and a branch conduit connecting to the main conduit at spaced points so as to be in parallel therewith, said probes extending from the sides of the branch conduit, said valve means including a main valve in said main conduit between said spaced points and first and second valves in the branch conduit between the spaced points and the start and end of the horizontal row of extending probes so that ice can be delivered to the probes by closing the main valve and opening at least the first valve, both said first and second valves being closed when liquid ice is not being injected into cartons from said probe.

6. An apparatus according to claim 4, including a cold water receiving pump for returning cold water accumulated in the bottom of said frame structure to said source of liquid ice.

* * * * *